(12) United States Patent
Wyser et al.

(10) Patent No.: US 6,348,851 B1
(45) Date of Patent: Feb. 19, 2002

(54) BREAKER SWITCH AND BATTERY INCLUDING THE SAME

(75) Inventors: Paul Julian Wyser, Appenzell; Jürg Schnidrig, Diegten, both of (CH)

(73) Assignee: Renata A.G., Itingen (CH)

( * ) Notice: Subject to any disclaimer, the term of this patent is extended or adjusted under 35 U.S.C. 154(b) by 0 days.

(21) Appl. No.: 09/373,575

(22) Filed: Aug. 13, 1999

(30) Foreign Application Priority Data

Aug. 14, 1998 (EP) .............................. 98115337

(51) Int. Cl.$^7$ .................. H01H 37/76; H01H 37/52
(52) U.S. Cl. .................. 337/411; 337/31; 337/36; 337/407
(58) Field of Search .................. 337/36, 52, 401, 337/402, 407, 411, 417, 31; 29/622

(56) References Cited

U.S. PATENT DOCUMENTS

| | | | | |
|---|---|---|---|---|
| 2,790,049 A | * | 4/1957 | McAlister | 200/142 |
| 3,198,914 A | * | 8/1965 | Baran et al. | 200/142 |
| 3,420,217 A | * | 1/1969 | Powell et al. | 123/198 |
| 3,629,766 A | * | 12/1971 | Gould, Jr. | 337/239 |
| 3,763,454 A | * | 10/1973 | Zandonatti | 337/404 |
| 3,827,014 A | * | 7/1974 | Wehl | 337/407 |
| 4,276,532 A | * | 6/1981 | Aoki | 337/408 |
| 4,433,231 A | * | 2/1984 | Balchunas | 219/253 |
| 4,441,093 A | * | 4/1984 | Okazaki | 337/404 |
| 4,536,641 A | * | 8/1985 | Chan | 219/253 |
| 5,192,937 A | * | 3/1993 | Lee | 337/104 |
| 5,280,262 A | * | 1/1994 | Fischer | 337/405 |
| 5,600,295 A | * | 2/1997 | Kaufmann | 337/405 |
| 5,612,662 A | * | 3/1997 | Drekmeier et al. | 337/389 |
| 5,896,080 A | * | 4/1999 | Chen | 337/407 |
| 5,982,270 A | * | 11/1999 | Wolfe, Jr. et al. | 337/401 |

FOREIGN PATENT DOCUMENTS

| | | | |
|---|---|---|---|
| DE | 28 19 583 | 11/1979 | |
| DE | 29 47 016 | 5/1981 | |
| DE | 196 39 427 | 3/1997 | |
| DE | 196 05 187 | 8/1997 | |
| FR | 2 655 479 | 6/1991 | |
| JP | 10-275546 A | * 10/1998 | ......... H01H/37/76 |
| JP | 10-275547 A | * 10/1998 | ......... H01H/37/76 |
| JP | 11-204005 A | * 7/1999 | ........... H01M/2/34 |
| WO | 94 03 913 | 2/1994 | |
| WO | 96 30 955 | 10/1996 | |

* cited by examiner

Primary Examiner—Leo P. Picard
Assistant Examiner—Anatoly Vortman
(74) Attorney, Agent, or Firm—Sughrue Mion, PLLC

(57) ABSTRACT

Breaker switch arranged on a wall (4) of an electric device (9) including a receptacle (20), containing a thermofusible composition (25) having a softening point $\theta_1$, and a flexible metal strip (10) interposed between two studs (2a, 2b) fixed by one end to the wall (4) extending above the receptacle (20) and being provided in its free portion with means (14, 18–19) for the anchoring thereof in said thermofusible composition to bend the strip (10) against the two studs (2a, 2b). The receptacle (20) is advantageously extended by a heat probe (27) going to the core of the device (9). When the temperature of the device (9) exceeds $\theta_1$ the anchoring means (14) are released from the thermofusible composition by the elastic return force of the strip (10) thereby opening the contact between the studs (2a, 2b). Application to a battery, in particular of the lithium-ion type.

20 Claims, 5 Drawing Sheets

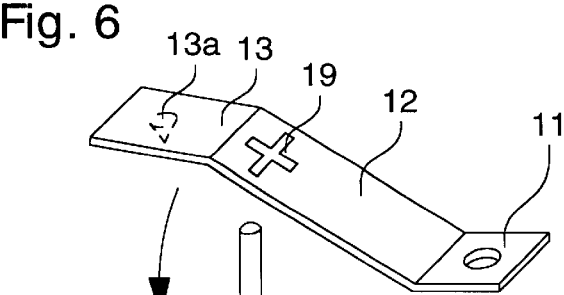
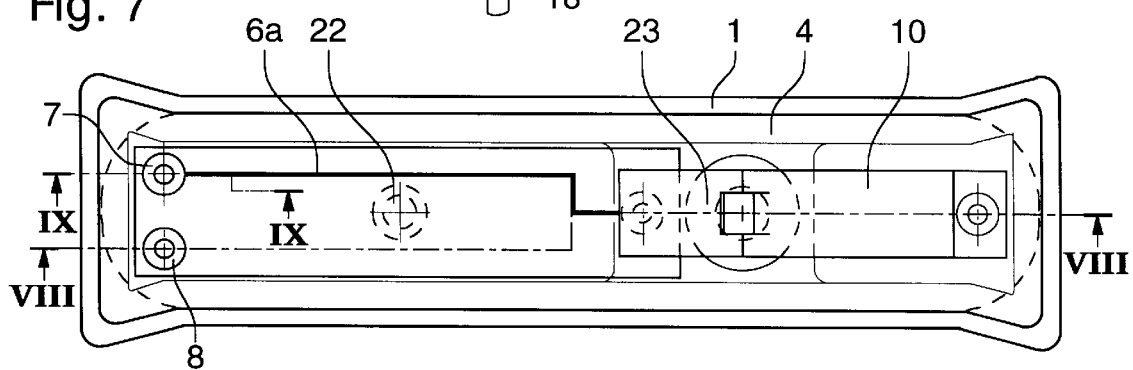
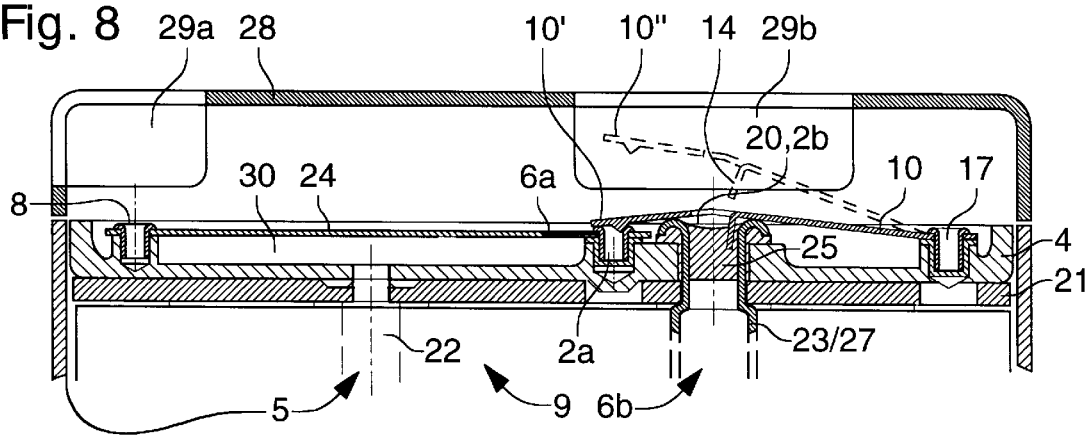
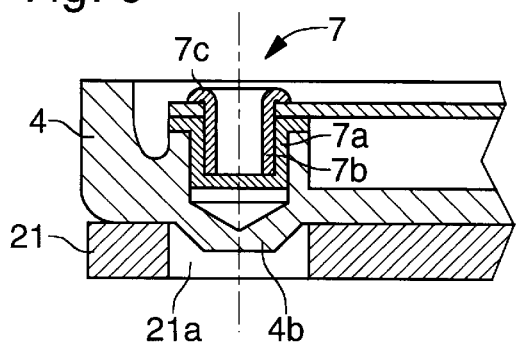
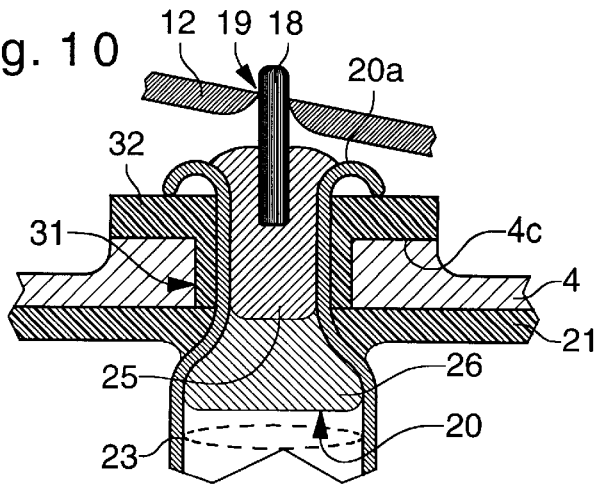

BREAKER SWITCH AND BATTERY INCLUDING THE SAME

BACKGROUND OF THE INVENTION

The present invention concerns a breaker switch arranged on at least one connection means of an electric power supply or consumer device contained in a container whose internal operating temperature must not exceed a determined critical value for safety reasons.

The invention concerns in particular power supplies such as batteries and accumulators, designated hereinafter by the generic term "battery" whether the power supply is rechargeable or not, said batteries being provided with such a breaker switch which is sensitive to an abnormal rise in temperature.

The invention concerns more particularly such batteries of the lithium-ion type, of generally prismatic shape and having a high power density, a feature which is sought after for increasingly widely used portable devices such as mobile telephones, video cameras and other electronic devices. The working of such batteries is however delicate which can present risks for the user or for the contiguous electronic circuits. Indeed, when the battery is in a closed circuit with a strong current demand, during the charging phase for the accumulators, or during a malfunction due for example to improper use or storage at too high a temperature, the chemical reactions which are generated can cause partial decomposition of the electrolyte with generation of a gaseous release leading to and increase in pressure inside the battery container and a rise in temperature able to cause an explosion, inflammation, and damage to the contiguous electronic circuits.

In order to overcome this drawback, such batteries have to be fitted with safety devices causing a reduction in the internal pressure by means of a vent, a reduction in temperature and/or switching off the battery via a breaker switch. For batteries used in portable devices, one cannot envisage incorporating a heat exchanger able to control a rise in temperature as a safety device.

By way of example of a vent safety device, the device disclosed in European Patent No. 0 554 535, wherein an increase in internal pressure causes the opening of a valve which is normally kept closed by the pressure of an elastic washer, may be cited.

In European Patent Application No. 98105760, in the name of the Applicant and incorporated in the present application by reference, a particular arrangement of a thermofusible composition around a terminal of the battery allows a vent to be opened when the temperature reaches an abnormally high value.

By way of example of a breaker switch, U.S. Pat. No. 4,943,497, which in a way constitutes an improvement to European Patent No. 0 554 535, in that the increase in internal pressure in the battery also causes breakage of the connection means between a terminal and the active material within the battery, may be cited. Devices of this type have the drawback of relying on more or less complex mechanical arrangements, which contributes to increasing the cost of the end product.

Small devices which can be adapted to the exterior of a battery whose resistance has a very high variation at a determined temperature, for example between 100° C. and 110° C., such as the devices proposed under the name "Polyswitch" by the Raychem company, have also been proposed by way of breaker switch. It is clear that such devices are sensitive to a nearby temperature but cannot react to the internal temperature of the battery. Even if these devices allow the battery to be used again after each incident, the resistance hysteresis phenomena have a very unfavourable effect on the reliability and lifespan of said battery. These "polyswitches" further have the drawback of having a resistance value which is close to the internal resistance value of the battery.

SUMMARY OF THE INVENTION

The object of the present invention is to overcome the aforementioned drawbacks by providing a breaker switch, sensitive to an abnormal rise in temperature integrated in a power supply or consumer device, and more particularly a breaker switch for a battery, of new design but sufficiently simple so as not to substantially increase the cost of the end product.

The invention therefore concerns a breaker switch arranged on at least one connection means between the outer terminals and an electric power supply or consumer device, contained in a container and whose internal operating temperature must not exceed a critical value $\theta_1$. This breaker switch is arranged on a wall and in thermal communication with said container. It includes a receptacle intended to accommodate a thermofusible composition having a softening point $\theta_1$, and a flexible metal strip interposed between two studs electrically breaking said connection means. The flexible strip extends above said receptacle while being fixed by one of its ends to the wall of the container and being provided in its free portion with anchoring means in said thermofusible composition. This flexible strip can occupy a first position called the closed position, in which the anchoring means are held in the thermofusible composition while its free portion is bent towards the wall of said container to establish an electric contact between the studs, and a second position called the open position in which it is released from the thermofusible composition by its elastic return force thereby opening the contact between the studs, when the temperature of the container is higher than melting temperature $\theta_1$ of the thermofusible composition.

These anchoring means are formed by any means allowing a free portion of the strip and the receptacle containing the thermofusible composition to be fixed to each other while pressing said strip towards the container wall.

According to a first embodiment, these anchoring means are formed by a lug welded to the strip or formed therefrom.

According to a first variant, the anchoring lug is formed simply by bending back the free end of the strip. According to a second variant, the anchoring lug is attached to a median portion of the strip by welding, or is integral with the latter by a cut in a U shape which is open towards one of the ends of the strip. In this variant, the free portion situated beyond the lug allows an electric contact to be established with the stud.

In this first embodiment, the solidity of the setting of the lug in the thermofusible composition can be increased by providing additional anchoring means such as transverse cutting, folding a U shaped cut portion, roughness created or added on its surface, or simply by deforming its distal portion out of its plane.

According to a second embodiment, these anchoring means are created at the moment of use, by click fitting a pin, fixed in the thermofusible composition, in a cut out part formed in a free portion of the strip, said cut out part being for example in the shape of a cross.

In order to take account of the effective critical temperature of the device, the receptacle is advantageously extended by a heat probe which goes to the core of the container.

This type of breaker switch is particularly well suited to a battery, in particular a lithium-ion type battery which has the highest risk of malfunction. It can simply be added between a terminal and a conductor wire connected to a current collector. According to a preferred embodiment, the breaker switch includes a heat probe formed by a flattened metal bar or tube forming the anode or the cathode of the battery, the thermofusible composition receptacle being one of the studs of the connection means. A battery of this type can obviously also be provided with a safety vent of the type of those known in the prior art. According to a preferred embodiment, this safety vent is sensitive, not to an increase in the internal pressure of the battery, but to a rise in temperature and is formed by a passage passing through the cover and sealed by a thermofusible composition which is identical or different to that used for the breaker switch. According to another feature of the invention, the receptacle containing the thermofusible composition of the breaker switch is open towards the exterior and also forms the safety vent when the battery temperature exceeds a determined critical temperature. According to a variant which provides the battery with two levels of security, the sealing of the open receptacle is effected with two superposed thermofusible compositions: the first triggers the breaker switch when the temperature reaches the critical temperature and the second opens the vent when this temperature is exceeded by a certain number of degrees. It is possible to fix these two safety thresholds by a suitable selection from the thermofusible compositions available on the market, whose softening point can vary from 80° C. to 150° C.

BRIEF DESCRIPTION OF THE DRAWINGS

Other features and advantages of the present invention will appear in the following description made with reference to the annexed drawings, in which:

FIG. 6 shows in perspective an embodiment of the elastic strip of the breaker switch shown in FIGS. 5A, 5B and 5C;

FIG. 7 is a top view, on the cover side, of a prismatic battery provided with a breaker switch according to the invention;

FIG. 8 is a cross-section along the line VIII—VIII of FIG. 7;

FIG. 9 is a cross-section along the line IX—IX of FIG. 7; and

FIG. 10 is an enlarged cross-section of the receptacle of a variant embodiment of the breaker switch shown in FIGS. 5A, 5B and 5C.

FIG. 1A shows schematically in torn away perspective a container 1 one wall 4 of which supports terminals 7, 8 which are electrically connected by connection means 5, 6 to a device, schematically represented by the unit 9, and capable of consuming or supplying electric power while dissipating heat, such as a motor or a battery, to which more particular reference will be made later in the description. This device is confined in container 1, so that the heat dissipated increases the internal temperature of container 1 and that of its walls and the elements in heat communication with the latter. In the example shown, connection means 5, formed for example by a flexible conductor wire, directly connects terminal 8 to device 9. Connection means 6, connecting terminal 7, electrically insulated from wall 4, to device 9, includes two strands 6a, 6b interrupted by a breaker switch 3 which basically includes two parts, which are electrically insulated from wall 4: a flexible metal strip 10 and a receptacle 20 which is open towards the exterior and closed towards the interior in the example shown. Strip 10 includes a first portion 11 which is fixed onto wall 4 by means of a rivet 17, electrically insulated from wall 4 and forms the connection stud 2a to terminal 7, a fold 11a which, by the elastic return force of the material forming the strip, moves away from wall 4 a second portion 12, and a second fold 12a which directs a lug 14 towards the centre of receptacle 20. Flexible strip 10 is made of one of the materials known to those skilled in the art, such as a bronze-beryllium alloy. Receptacle 20, which also forms connection stud 2b with device 9, is open only towards the exterior and contains a thermofusible composition 25 in which the distal portion of lug 14 is embedded, which allows flexible strip 10 to be held pressed towards wall 4. In the example shown, receptacle 20 is in heat communication with the interior of container 1 solely via its outer cover. The thermofusible composition is selected from among those having a softening point comprised between 90° C. and 150° C., for example a eutectic Indium-Cadmium mixture having a softening point of 123° C.

FIG. 1B shows the breaker switch which has just been described when the temperature of the container becomes higher than the softening temperature of thermofusible composition 25. The elastic return force of strip 10 removes lug 14 from thermofusible composition 25 and thus breaks circuit 6 between terminal 7 and circuit 9.

Figure 1A:
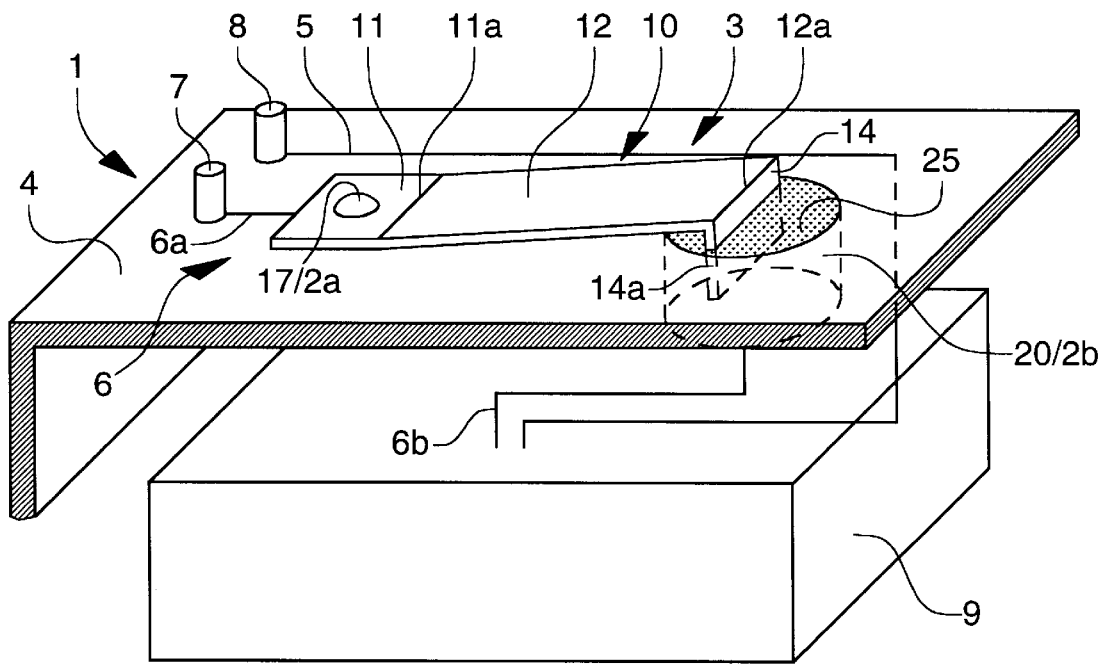
FIGS. 1A and 1B are schematic torn away perspective diagrams of a container one wall of which is provided with a breaker switch, according to a first embodiment, respectively in the closed and open position.
Figure 1B:
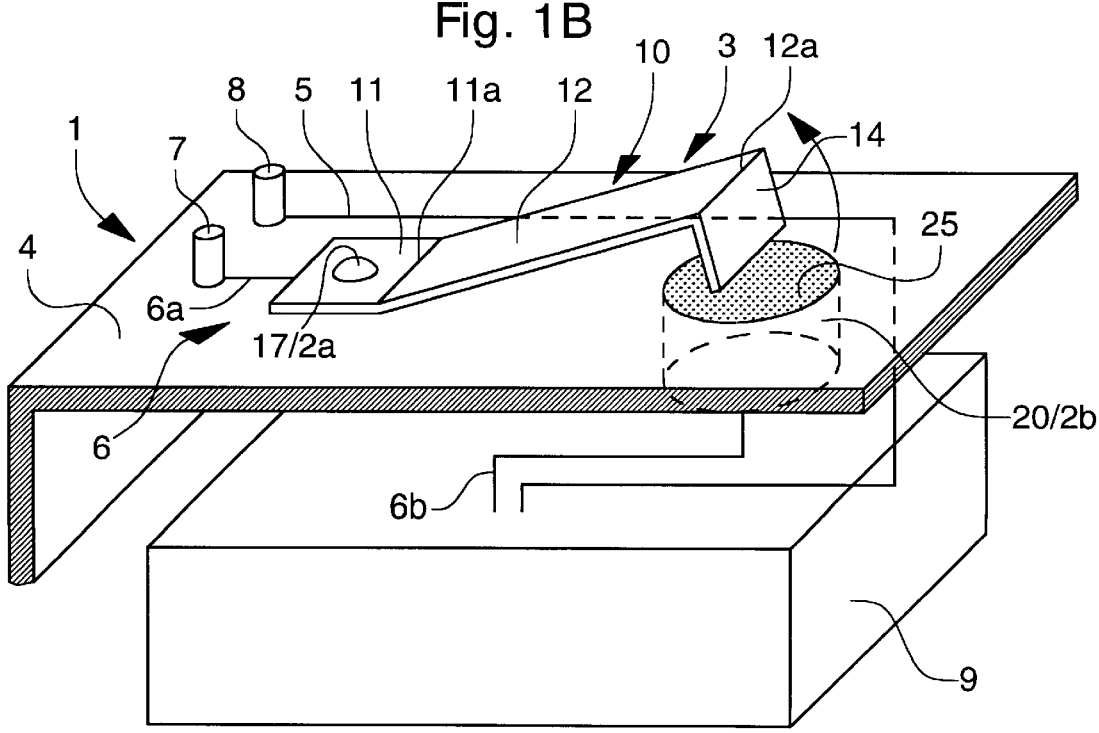
Figure 2:
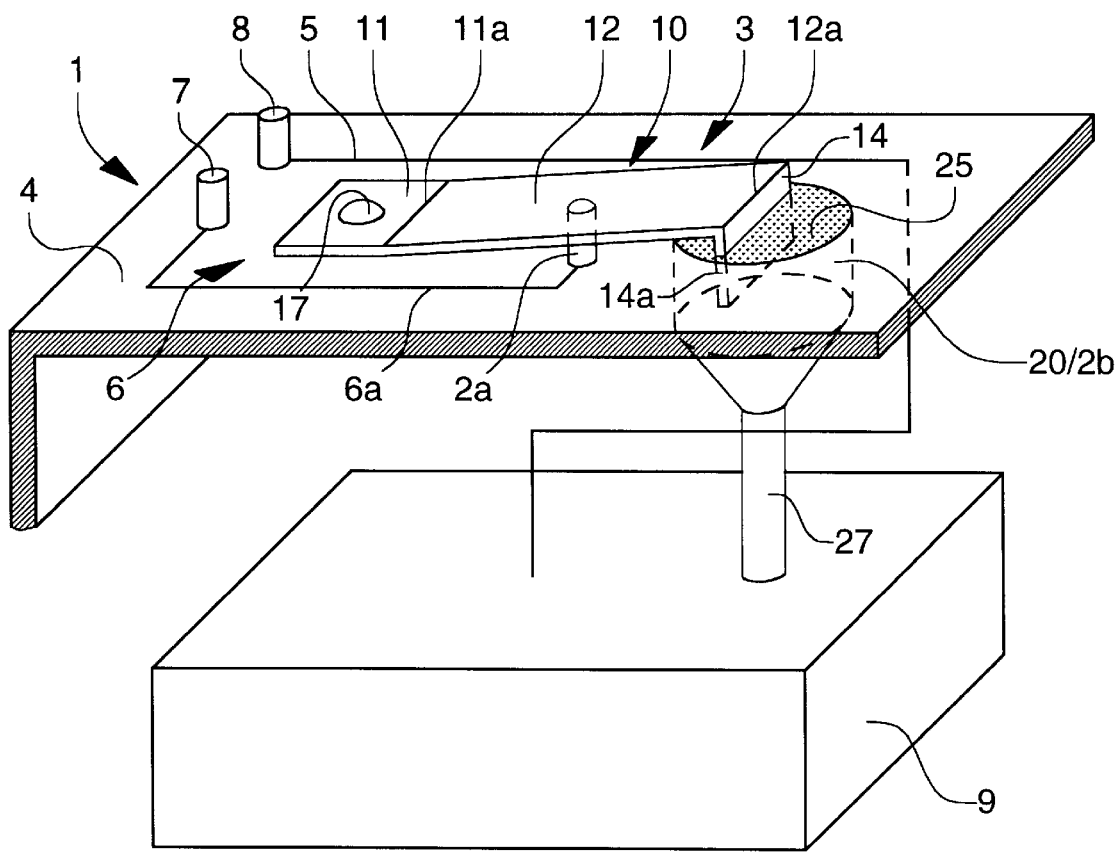
FIG. 2 shows a variant of the breaker switch shown in FIGS. 1A and 1B.

In the variant shown in FIG. 2, it will be noted that fixing rivet 17 of flexible strip 10 and connection stud 2a to terminal 7 are separate. Stud 2a, which is also electrically insulated from wall 4, is arranged between fixing rivet 17 and receptacle 20 which is electrically insulated from wall 4, as indicated hereinbefore. In this example, receptacle 20 is further extended by a core probe 27 directed towards the centre of container 1, i.e. to the heart of device 9, so that breaker switch 3 is set off as a function of the rise in internal temperature of the container. It will be observed that the electric insulation of receptacle 20 can be achieved with a material which also allows heat insulation, so that the temperature taken into account for setting off the breaker switch is effectively that which prevails at the core of the device.

In the embodiment which has just been described, it is of course possible to put exactly the same type of breaker switch on connection means 5.

Figure 3:
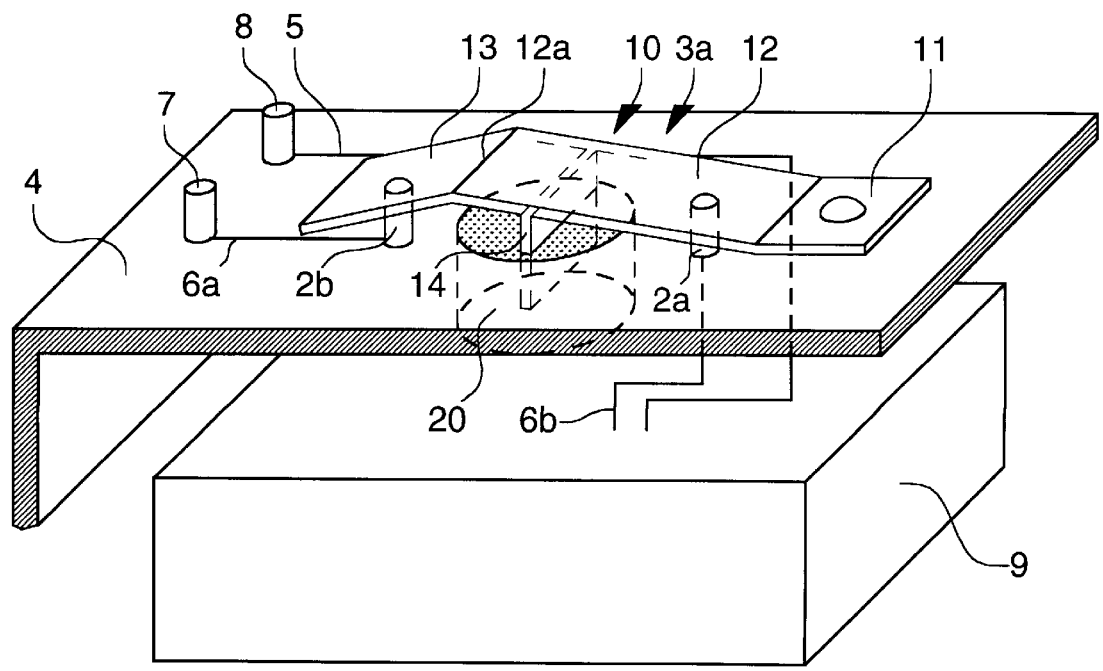
FIG. 3 is a schematic torn away perspective diagram of a second embodiment of a breaker switch according to the invention.
Figure 4:
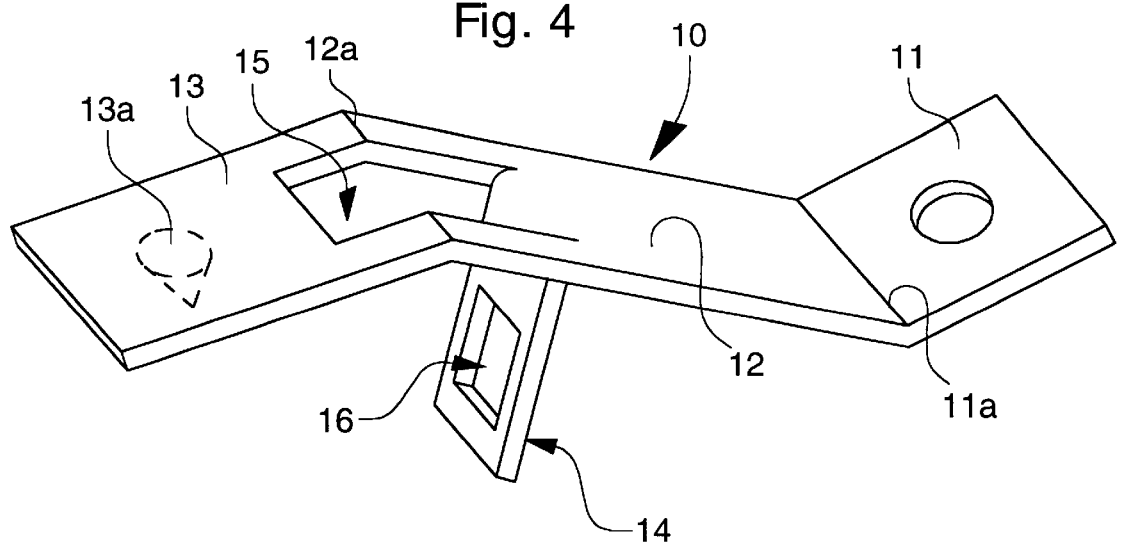
FIG. 4 shows in perspective the elastic strip of the breaker switch shown in FIG. 3.
Figure 4A:
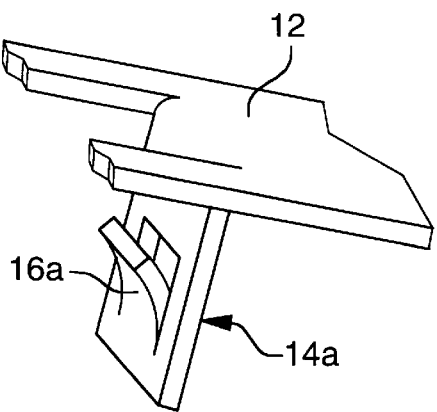
FIGS. 4A, 4B and 4C show variants of the lug of the elastic strip shown in FIG. 4.
Figure 4B:
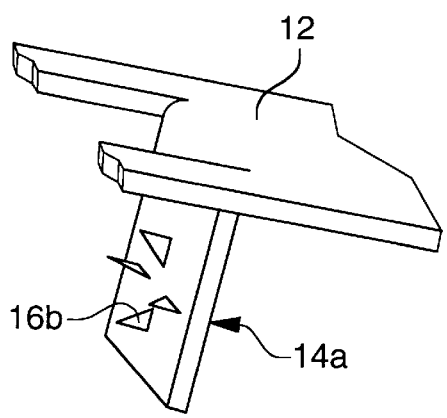
Figure 4C:
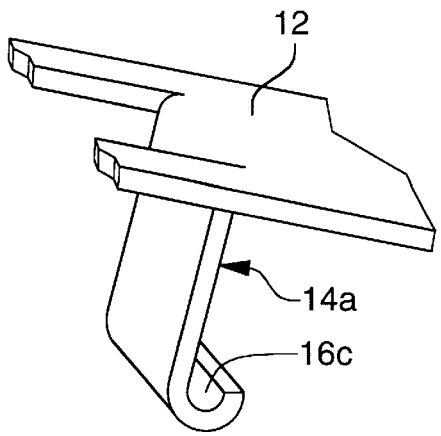

With reference now to FIGS. 3 and 4, a breaker switch 3a is shown in which the free portion 12 of strip 10 is extended beyond lug 14 by a portion 13 forming with portion 12 a slight fold 12a directing said portion 13 in the direction of wall 4. In other words, lug 14 is in the median portion of flexible strip 10. In the embodiment shown, contact studs 2a, 2b are situated on either side of receptacle 20, while being respectively in contact with portions 12 and 13 of the strip, the assembly formed by receptacle 20, thermofusible composition 25 and the lug having only a mechanical function. In order to increase the quality of contact with stud 2a, portion 12 of strip 10 can be provided with a contact point 13a in relief on the face turned towards cover 4, as is seen in FIG. 4. The particular shape of the flexible strip which has just been described can be achieved by any means known to those skilled in the art, but according to a preferred embodiment, shown in FIG. 4, it is obtained from a rectangular strip of appropriate length in which a U shaped part 15 is cut out with for example its three sides parallel to the edges and to a free end of the strip, this part being cut out to the desired dimensions of the lug, and then being bend back. As is seen in FIG. 4, it is also advantageous to provide additional means which increase the anchoring force of the lug in the thermofusible composition, such as through hole 16. It is of course possible to design similar additional anchoring means, such as a tongue 16a cut out of lug 14 (FIG. 4A), rough zones 16b added to or formed in the strip (FIG. 4B) or a bent deformation 16c of the end (FIG. 4C).

Figure 5A:
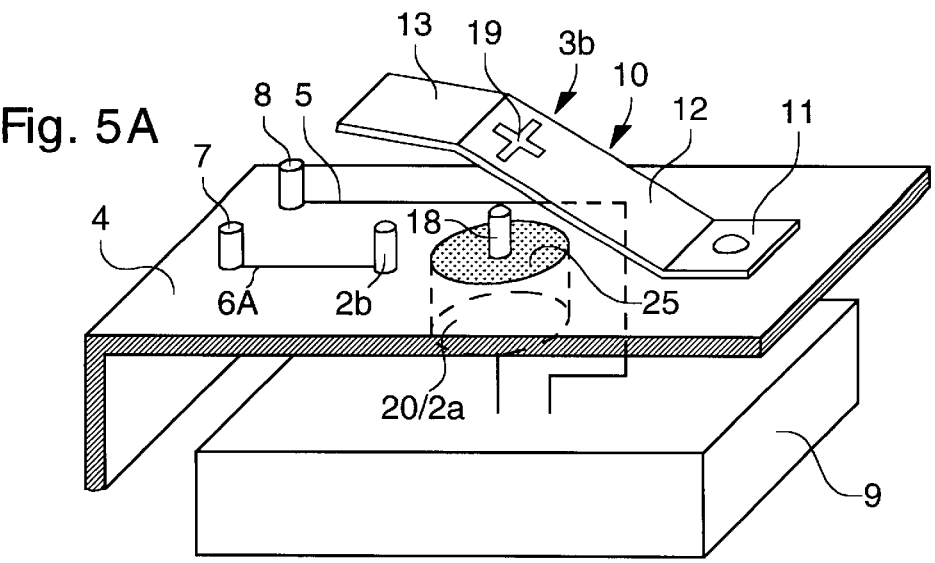
FIGS. 5A, 5B and 5C are schematic torn away perspective diagrams of the successive states of a third embodiment of a breaker switch according to the invention.
Figure 5B:
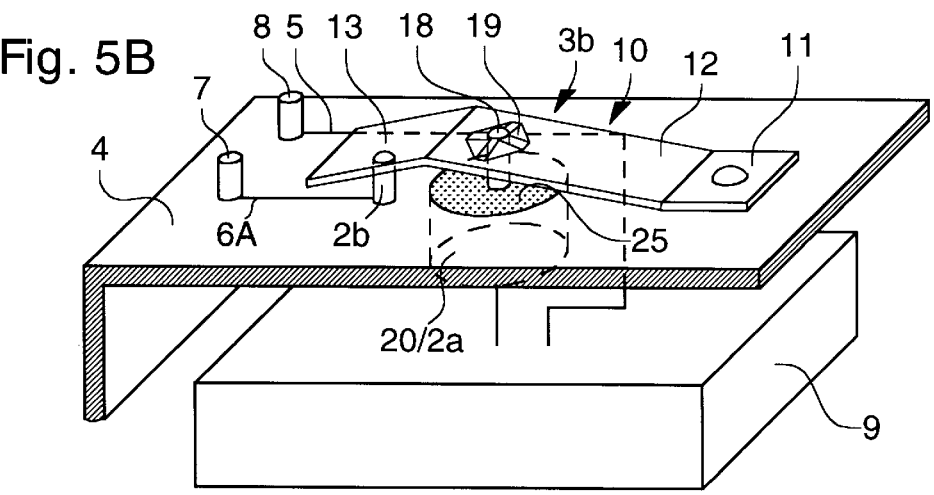
Figure 5C:
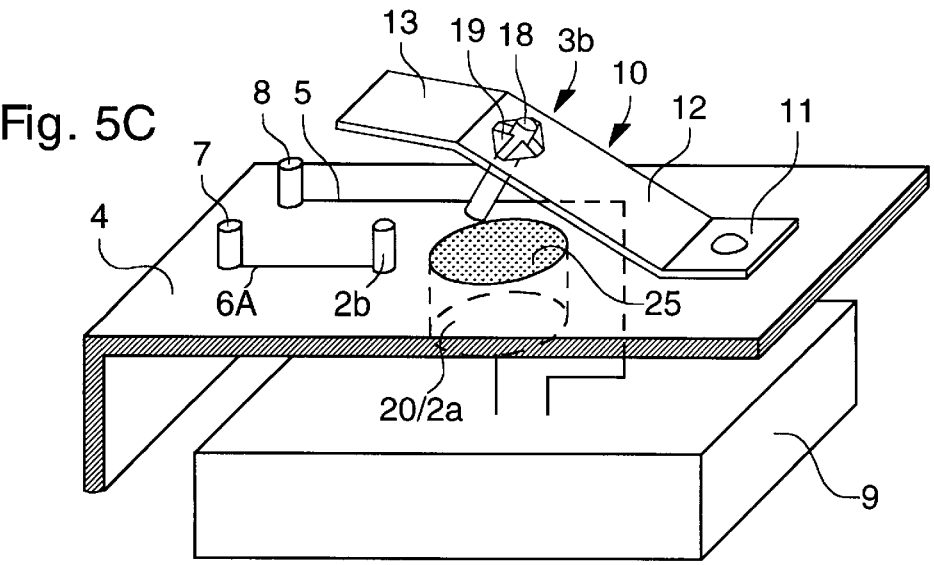

With reference now to FIGS. 5A, 5B, 5C and 6, a third embodiment of a breaker switch 3b is shown, which differs from those which have just been described by its anchoring means. FIG. 5A shows a container pre-fitted with a breaker switch 3b in the state in which it is delivered to the user, the anchoring means being provisionally separated from flexible strip 10. These anchoring means include on the one hand a pin 18 secured to thermofusible composition 25 contained in receptacle 20, on the other hand a part 19 cut out of strip 10, such that pin 18 can be irreversibly blocked when it is forced through said cut out part 19 as shown in FIG. 5B. When the user wishes to operate the device, he thus has to effect this setting operation, which constitutes additional security, during all the manipulations prior to operation. FIG. 5C shows the breaker switch when the safety system is set off, pin 18 being then removed from thermofusible composition 25 in the same way as lug 14.

FIG. 6 shows an example of part 19 cut in the shape of a star, of the type of those used in certain washers for blocking a shaft. Other equivalent means can be used to allow the click fitting of an elongated, but not necessarily cylindrical element in a plate.

Whatever the embodiment, it will be noted that the breaker switch according to the invention is of simple and economic construction, further having the advantage of allowing visual monitoring of a malfunction of power supply or consumer device 9. Moreover, safety is increased by the fact that the user cannot reset the breaker switch himself: this operation which consists in replacing the thermofusible composition and re-anchoring lug 14 or pin 18 can however be effected by the manufacturer or a specialist who will have checked beforehand whether or not the malfunction has damaged device 9.

FIGS. 7 to 9 show a prismatic battery of the lithium-ion type, whose closing cover 4 for container 1 is provided with a breaker switch whose flexible strip 10 corresponds for example to that shown in FIG. 4. This battery includes a winding of active materials impregnated with an electrolyte and respectively forming the anode and the cathode (not shown), and corresponding to power supply device 9. Cover 4 is separated from the active materials by an insulating plate 21 which is also used, as explained hereinafter, for positioning cover 4. The winding forming the cathode is electrically connected to a collector formed, for example by a flattened metal rod 22, which is itself connected to the case or to the cover to form conductor element 5 to positive terminal 8. The winding forming the anode is electrically connected to a collector formed by a tube 23 which is flattened inside container 1 and which opens outside the battery through cover 4, said tube 23 corresponding to connection strand 6b with the breaker switch. The upper portion of this tube, which is electrically insulated from cover 4, constitutes receptacle 20 of the breaker switch. Strip 10 is fixed via its end 11 to the cover by means of a rivet 17 which is electrically insulated from cover 4. In normal operation, the thermofusible seals receptacle 20 and holds strip 10 in a position 10' which establishes the contact, via end 13 of said strip with stud 2a, which is itself electrically connected via connection means 6a to negative terminal 7. Stud 2a and terminal 7 are electrically insulated from cover 4.

When the internal temperature of the battery exceeds a determined critical value, thermofusible composition 25 melts and flexible strip 10 occupies position 10" cutting the electric circuit. This construction also offers the advantage of providing a second safety feature by opening a vent which puts the inside of the battery in communication with the external environment thus allowing any risk of explosion due to the increase in internal pressure to be avoided.

Terminal 7, stud 2a and rivet 17 which are electrically insulated from cover 4 can have the same configuration, as shown in FIG. 9 for terminal 7. Cover 4 includes a cylindrical recess 4a, which is closed in its upper portion by a basin like shape portion 4b projecting towards the inside of the battery and allowing accurate positioning of cover 4 above a hole 21a formed in insulating plate 21. The inner surface of recess 4a and an annular strip 4c of its upper portion are insulated by an insulating gasket 7a in which a rivet 7b is driven, the edge 7c of which allows contact to be established with the portion of conductor 6a. This conductor portion 6a can be an ordinary flexible conductor or a flexprint 24.

In the case of a lithium-ion battery, it is also possible to arrange in the cover, for example under flexprint 24, an integrated circuit 30 allowing for example the type of battery to be identified, its lifespan to be indicated or the current flow to be monitored as well as constituting an additional primary safety feature.

This battery is sealed finally by a cap 28 arranged on the cover and wherein two openings 29a and 29b are formed. Opening 29a provides access to terminals 7, 8 and opening 29b allows setting and/or visual monitoring of the state of the breaker switch.

With reference now to FIG. 10, an enlarged cross-section of a variant of the breaker switch shown in FIGS. 7 to 9 is shown, in which the means for anchoring strip 10 in thermofusible composition 25 are those which were described with reference to FIGS. 5A to 6. This variant differs in that receptacle 20, which is open towards the inside of the battery, is sealed by a first thermofusible composition 25 having a softening point $\theta_1$, and by a second thermofusible composition 26, arranged towards the inside of container 1 and having a softening temperature $\theta_2$ which is higher than $\theta_1$. This variant allows an additional safety feature to be added, the rise in temperature inside the battery and thus the increase in internal pressure being able to follow a certain time after the breaker switch is set off. For the first thermofusible composition 25, activating the breaker switch, an eutectic mixture of indium, tin and cadmium can for example be used with a softening point of 93° C., and for the second thermofusible composition 26 an eutectic mixture of indium and cadmium with a softening point of 123° C. In FIG. 10, it will also be observed that the electric insulation of tube 23, which also forms receptacle 20 and stud 2a, is obtained by a tubular insulating gasket 31 whose upper portion rests on insulating plate 21 and whose lower portion has a collar 32 compressed between upper annular strip 4c of cover 4 and a riveted edge 20a of receptacle 20.

The examples which have just been given, in particular for a battery, show that it is possible to increase the safety of use by incorporating a breaker switch, with all the modifications for a given product being within the grasp of those skilled in the art, without departing from the scope of the invention.

What is claimed is:

1. A breaker switch arranged between two studs of at least one connection means connected between outer terminals and an electric power supply or consumer device, contained in a container and whose internal operating temperature must not exceed a critical value $\theta_1$, wherein a wall of said container carries a receptacle, intended to accommodate a thermofusible composition having a softening temperature $\theta_1$, and having heat transmission means with the container, and
   a flexible metal strip, interposed between the two studs, electrically breaking said connection means,
      said flexible strip extending above said receptacle, being fixed by one of its ends to the wall of the container and being provided in a free portion thereof with means for anchoring thereof in said thermofusible composition,
      said flexible strip being able to occupy a first position called the closed position, in which the anchoring means are held in the thermofusible composition while said free portion is bent towards the wall of said container to establish an electric contact between the studs, and a second position called the open position in which it is released from the thermofusible composition by its elastic return force thereby opening the contact between the studs when the temperature of the container becomes higher than the softening temperature $\theta_1$ of the thermofusible composition.

2. A breaker switch according to claim 1, wherein the anchoring means are formed by a bent lug fixed to the strip and substantially directed towards the center of the receptacle.

3. A breaker switch according to claim 1, wherein the anchoring means are formed by a pin fixed to the thermofusible composition and by click fitting means formed by a part cut out of the free portion of the strip to lock said pin.

4. A breaker switch according to claim 2, wherein the bent lug is situated on an end of the free portion of the strip.

5. A breaker switch according to claim 4, wherein the studs of the connection means are respectively identical with the receptacle for the thermofusible composition and with a rivet for fixing the strip onto the wall.

6. A breaker switch according to claim 4, wherein one stud of the connection means is arranged between the receptacle and a fixing rivet of the strip, and wherein the other stud is formed by the receptacle or the rivet.

7. A breaker switch according to claim 2, wherein the bent lug is situated in a median portion of the strip.

8. A breaker switch according to claim 7, wherein the studs of the connection means are situated on either side of the receptacle.

9. A breaker switch according to claim 7, wherein one stud of the connection means is arranged below the free portion of the strip, and wherein the other stud is formed by the receptacle or a rivet fixing the strip to the wall.

10. A breaker switch according to claim 7, wherein the bent lug is formed by cutting out and folding a median portion of the strip.

11. A breaker switch according to claim 2, wherein the bent lug further includes means allowing the anchoring thereof in the thermofusible composition to be increased, said last-mentioned means being selected,
   for the bent lug being on a median portion of said strip, from among a through cut out part, a cutting out and folding of a small portion of said median portion, and rough zones added to or formed on a face of said bent portion, and
   for the free portion, as a deformation out of a plane of the lug.

12. A breaker switch according to claim 3, wherein the click fitting means are formed by a cut out portion of the strip in the shape of a cross.

13. A breaker switch according to claim 1, wherein the receptacle is extended by a heat probe directed towards an inside of the container.

14. A breaker switch according to claim 1, wherein the outer envelope of the receptacle penetrates inside the container.

15. A battery, whose internal operating temperature must not exceed a critical value $\theta_1$, including a metal container sealed by a cover and enclosing active materials, impregnated by an electrolyte, and respectively forming an anode and a cathode, said cover being separated from the active materials by an insulating plate and carrying two studs connected by connection means to the anode and the cathode, wherein at least one of the connection means is provided on said cover with a breaker switch, said breaker switch comprising:

- a receptacle filled with a composition having the softening temperature $\theta_1$; and
- a flexible metal strip interposed between the studs and extending above said receptacle while being fixed by one of its ends to the cover and being provided in a free portion thereof with means for anchoring thereof in said thermofusible composition,
  said flexible strip being able to occupy a closed position, in which the anchoring means are held in the thermofusible composition and bend the free portion towards the cover to establish an electric contact between the studs, and to occupy an open position in which it is released from the thermofusible composition by its elastic return force thereby opening the contact between the studs when the temperature of the container becomes higher than the softening temperature $\theta_1$ of the thermofusible composition.

16. A battery according to claim 15, wherein the receptacle is extended by a heat probe formed by a metal bar or tube connected to the anode or to the cathode, and wherein the receptacle is one of the studs of the connection means.

17. A battery according to claim 16, wherein the cover further includes a safety vent formed by a through passage, said passage being sealed by a thermofusible composition which is identical to or different from that of the receptacle.

18. A battery according to claim 17, wherein the thermofusible composition arranged in the vent has a softening temperature $\theta_2$, which is higher than the softening temperature $\theta_1$ of the thermofusible composition arranged in the receptacle of the breaker switch.

19. A battery according to claim 16, wherein the receptacle is also open towards the inside of the battery to form a safety vent when the internal temperature is higher than softening temperature $\theta_1$ of the thermofusible composition.

20. A battery according to claim 19, wherein the receptacle further includes in its portion which is open inwards a second thermofusible composition having a softening temperature $\theta_2$ higher than $\theta_1$.

* * * * *